United States Patent
Liu et al.

(10) Patent No.: US 12,249,988 B2
(45) Date of Patent: Mar. 11, 2025

(54) CIRCUITS AND METHODS FOR DETECTING DECREASES IN A SUPPLY VOLTAGE IN AN INTEGRATED CIRCUIT

(71) Applicant: Intel Corporation, Santa Clara, CA (US)

(72) Inventors: Ping-Chen Liu, Fremont, CA (US); Guang Chen, Fremont, CA (US); Venu Kondapalli, San Jose, CA (US)

(73) Assignee: Altera Corporation, San Jose, CA (US)

( * ) Notice: Subject to any disclaimer, the term of this patent is extended or adjusted under 35 U.S.C. 154(b) by 751 days.

(21) Appl. No.: 17/353,549

(22) Filed: Jun. 21, 2021

(65) Prior Publication Data

US 2021/0313989 A1    Oct. 7, 2021

(51) Int. Cl.
| | |
|---|---|
| *H03K 21/40* | (2006.01) |
| *G06F 1/28* | (2006.01) |
| *H03K 19/1778* | (2020.01) |
| *H03K 21/08* | (2006.01) |

(52) U.S. Cl.
CPC ......... *H03K 19/1778* (2013.01); *H03K 21/08* (2013.01)

(58) Field of Classification Search
CPC ............. H03K 19/17784; H03K 21/40; H03K 21/403; G01R 31/2879; G06F 21/755; G06F 1/28; G06F 1/30; H02H 3/28
USPC ....................................................... 327/545
See application file for complete search history.

(56) References Cited

U.S. PATENT DOCUMENTS

| | | | |
|---|---|---|---|
| 8,605,401 B2 | 12/2013 | Pedersen et al. | |
| 10,474,846 B1 | 11/2019 | Rezayee et al. | |
| 11,899,789 B2 * | 2/2024 | Heo | G06F 21/554 |
| 2019/0138754 A1 | 5/2019 | Koay et al. | |

(Continued)

FOREIGN PATENT DOCUMENTS

CN       111670366        9/2020

OTHER PUBLICATIONS

European Patent Office, Extended European Search Report and European Search Opinion for European patent application 22160437.4 dated Aug. 23, 2022.

(Continued)

*Primary Examiner* — Hai L Nguyen
(74) *Attorney, Agent, or Firm* — InventIQ Legal LLP; Steven J. Cahill

(57) ABSTRACT

An integrated circuit includes a first voltage decrease detection circuit that has a first comparator circuit that compares a supply voltage in the integrated circuit to a threshold voltage to generate a first detection signal that indicates a decrease in the supply voltage, and a first timestamp storage circuit that stores a first timestamp in response to the first detection signal indicating the decrease. The integrated circuit includes a second voltage decrease detection circuit that has a second comparator circuit that compares the supply voltage to the threshold voltage to generate a second detection signal that indicates the decrease, and a second timestamp storage circuit that stores a second timestamp in response to the second detection signal indicating the decrease. The integrated circuit includes a control circuit that determines a location of a source of the decrease in the integrated circuit based on the first and the second timestamps.

20 Claims, 3 Drawing Sheets

(56) References Cited

U.S. PATENT DOCUMENTS

2020/0226295 A1  7/2020 Patel et al.
2022/0012370 A1  1/2022 Yang et al.

OTHER PUBLICATIONS

Provelengios et al., "Characterizing Power Distribution Attacks in Multi-user FPGA Environments," 2019 29th International Conference on Field Programmable Logic and Applications (FPL), 2019, pp. 194-201.

* cited by examiner

CIRCUITS AND METHODS FOR DETECTING DECREASES IN A SUPPLY VOLTAGE IN AN INTEGRATED CIRCUIT

FIELD OF THE DISCLOSURE

The present disclosure relates to electronic circuits, and more particularly, to circuits and methods for detecting decreases in a supply voltage in an integrated circuit.

BACKGROUND

In a spatial multi-tenant application for a field programmable gate array (FPGA), the core programmable logic fabric of the FPGA consists of logic designs from different tenants that run simultaneously to boost utilization of the FPGA. Although each tenant has an isolated region in the FPGA, the on-die power supply voltage distribution networks in the FPGA are shared. This application raises a plethora of security concerns, including supply voltage attacks. To cause a supply voltage attack, one malicious tenant in an FPGA can create a substantial change in the power supply current through the programmable logic fabric that causes a decrease in the supply voltage that exceeds a threshold used for timing constraints. The circuit functionality in the other FPGA tenants are then compromised, for example, as a result of functional failures in neighboring tenants caused by timing violations.

DETAILED DESCRIPTION

Figure 1:
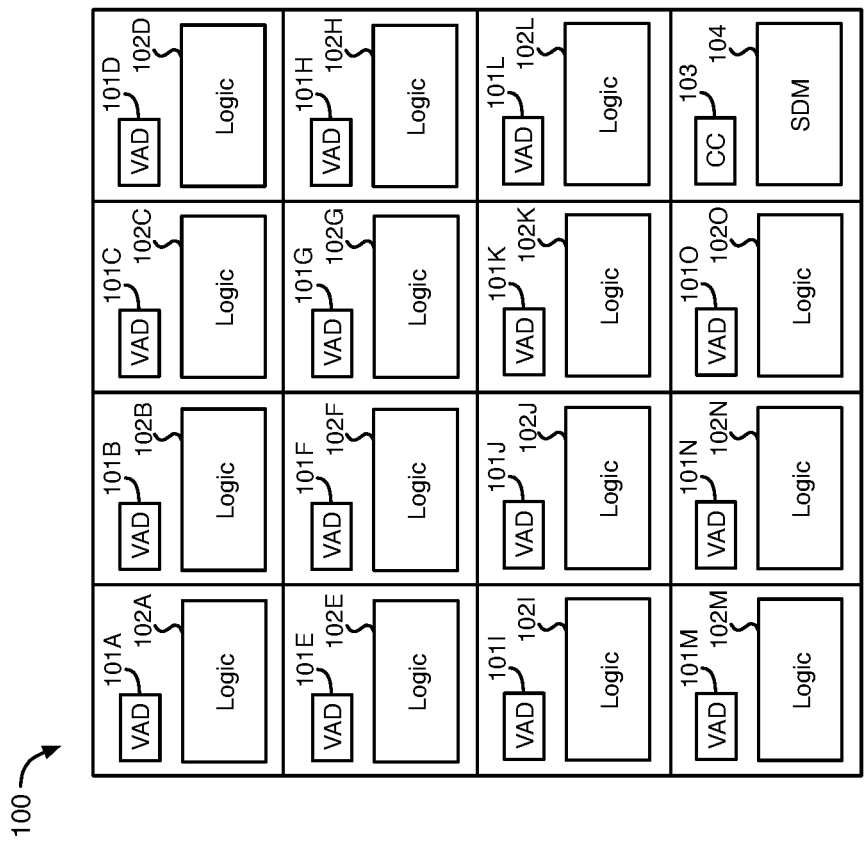
FIG. 1 illustrates a top down view of an exemplary integrated circuit containing sectors of logic circuits and voltage attack detection circuits, according to an embodiment.

In one type of supply voltage attack that has occurred in spatial multi-tenant applications for field programmable gate arrays (FPGAs), a single sector of logic circuits in an FPGA generates an electrical event that causes a large supply current draw from the supply voltage delivery network. The large supply current draw causes a substantial decrease in the supply voltage creating a supply voltage droop waveform that propagates from the single sector that is the source of the attack to other neighboring sectors of logic circuits in the FPGA. The supply voltage droop waveform may cause functional and timing failures in the logic circuits in the neighboring sectors. As the supply voltage droop waveform propagates from the sector that is the source of the attack to other sectors of logic circuits that are increasingly farther away from the source of the attack, the voltage level of the supply voltage droop attenuates.

In other types of supply voltage attacks that have occurred in spatial multi-tenant applications for FPGAs, multiple sectors of logic circuits in an FPGA generate an electrical event that causes a large supply current draw from the supply voltage delivery network. For example, aggressor sectors of logic circuits in one-half of an FPGA may generate an electrical event that causes a large supply current draw from the supply voltage delivery network. Because multiple sectors of logic circuits are involved in creating these large supply current events, the supply voltage may decrease more than if a single sector is creating the event.

A key difference between an aggressor in a single sector compared to an aggressor in half of the sectors in an FPGA is the voltage gradient profile of the supply voltage droop waveform caused by the large supply current draw from the aggressor. The voltage attenuation from the aggressor sectors to the neighboring (victim) sectors is much smaller (e.g., 1-2 millivolts) during a supply voltage attack that is initiated by half of the sectors of logic circuits in an FPGA. Therefore, using a digital sensor to create a voltage spatial map of the supply voltage droop waveform is much more challenging when the attack is initiated by half of the sectors in an FPGA. However, the minimum delay for the supply voltage droop waveform to propagate to the nearest neighboring sector may be large enough (e.g., greater than 10 nanoseconds) to identify the source of the attack.

According to some embodiments, voltage attack detection circuits in an integrated circuit (IC) identify the occurrence of a malicious supply voltage attack in the IC and the location of the source of the attack within the IC. Each of the voltage attack detection circuits may be located in a sector in the IC die. The voltage attack detection circuits can detect decreases in a supply voltage in the IC that may, for example, be inadvertent or caused by a malicious attack. The voltage attack detection circuits can also detect one or more sources within the IC that caused the decreases in the supply voltage. The voltage attack detection circuits are also referred to herein as voltage decrease detection circuits. Each of the voltage attack detection circuits may include a comparator, an output latch, a synchronized counter circuit, and a timestamp storage circuit. The comparator detects a decrease in the supply voltage below a threshold voltage. The threshold voltage is selected to be indicative of a supply voltage level that can cause timing violations in logic circuits in the sectors. The synchronized counter circuit is used as a time reference to record the time that a voltage attack occurs. When the comparator detects that the supply voltage has decreased below the threshold voltage indicating an attack has occurred, the comparator and the output latch stop the counter circuit from counting. The counter circuit stores the count value that indicates the occurrence time of the attack. The count value is then loaded from the counter circuit to the timestamp storage circuit and stored as a timestamp. The timestamp is then transmitted to a central control circuit. The central control circuit creates a spatial timestamp map for the IC to identify the location of the source of the attack based on timestamps accessed from voltage attack detection circuits throughout the IC.

Throughout the specification, and in the claims, the term "connected" means a direct electrical connection between the circuits that are connected, without any intermediary devices. The term "coupled" means either a direct electrical connection between circuits or an indirect connection between circuits through one or more passive or active intermediary devices. The term "circuit" may mean one or more passive and/or active electrical components that are arranged to cooperate with one another to provide a desired function.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Figure (FIG. 1 illustrates a top down view of an exemplary integrated circuit (IC) 100 containing sectors of logic circuits and voltage attack detection circuits, according to an embodiment. The integrated circuit (IC) 100 may be any type of IC die, such as a programmable logic IC (e.g., a field programmable gate array (FPGA)), a microprocessor IC, a graphics processing unit (GPU) IC, etc. IC 100 includes 16 sectors that are arranged in 4 rows and 4 columns. The sectors may also be referred to as regions of the IC. 16 sectors are shown in IC 100 merely as an example that is not intended to be limiting. Integrated circuits containing embodiments of the present disclosure may contain any number of sectors, any number of logic circuits, and any number of voltage attack detection circuits. 15 of the sectors in IC 100 include 15 regions 102A-102O of logic circuits and 15 voltage attack detection (VAD) circuits 101A-101O. Each of these sectors in IC 100 includes one voltage attack detection circuit 101 and one region 102 of logic circuits. The logic circuits in regions 102A-102O may include, for example, programable logic circuits, non-programmable logic circuits, memory circuits, digital signal processing circuits, or any combination thereof. IC 100 also includes an additional sector that includes a central control (CC) circuit 103 and a secure device manager (SDM) circuit 104. The SDM circuit 104 performs security functions. The voltage attack detection circuits 101 and the central control circuit 103 are disclosed in more detail with respect to FIG. 2.

Figure 2:
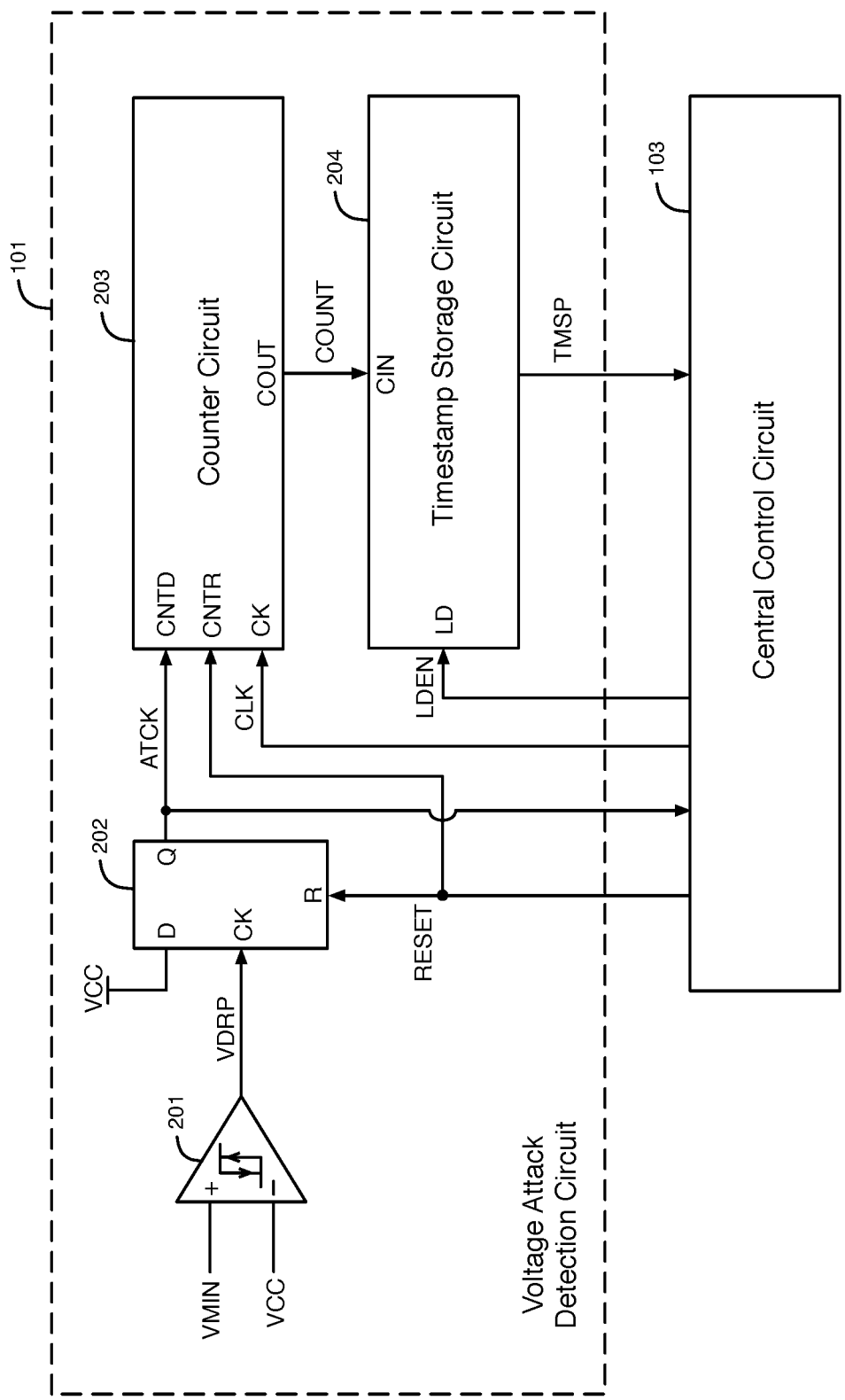
FIG. 2 illustrates further details of the voltage attack detection circuits and the central control circuit of FIG. 1, according to an exemplary embodiment.

FIG. 2 illustrates further details of a voltage attack detection circuit 101 and the central control circuit 103 in IC 100, according to an exemplary embodiment. According to some embodiments, each of the voltage attack detection circuits 101A-101O in IC 100 may have the same circuitry that is shown in FIG. 2. The voltage attack detection circuit 101 shown in FIG. 2 includes an analog hysteretic comparator circuit 201, an output latch circuit 202, a synchronous counter circuit 203, and a timestamp storage circuit 204. Timestamp storage circuit 204 may include, for example, timestamp registers.

A threshold voltage VMIN is provided to the non-inverting (+) input of the hysteretic comparator circuit 201. The threshold voltage VMIN is selected to be indicative of a supply voltage level that typically causes timing violations in logic circuits in regions 102A-102O. A supply voltage VCC is provided to the inverting input (−) of the hysteretic comparator circuit 201. Central control circuit 103 generates a periodic clock signal CLK that is provided to a clock (CK) input of the counter circuit 203. The clock signal CLK generated by the central control circuit 103 is provided to the clock (CK) inputs of the counter circuits 203 in all of the voltage attack detection circuits 101A-101O in IC 100.

The central control circuit 103 generates a synchronous reset signal RESET that is provided to the reset (R) input of the latch circuit 202 and to the reset (CNTR) input of the counter circuit 203. The RESET signal generated by the central control circuit 103 is provided to the reset (R) inputs of the latch circuits 202 in all of the voltage attack detection circuits 101A-101O in IC 100. The RESET signal generated by the central control circuit 103 is also provided to the reset (CNTR) inputs of the counter circuits 203 in all of the voltage attack detection circuits 101A-101O in IC 100.

Initially, the central control circuit 103 asserts the synchronous RESET signal to reset all of the counter circuits 203 and all of the latch circuits 202 in IC 100. In response to the RESET signal being asserted, each of the latch circuits 202 in the voltage attack detection circuits 101A-101O de-asserts the output signal ATCK at its Q output. Each of the counter circuits 203 generates COUNT signals at its COUT outputs, as shown in FIG. 2. In response to the RESET signal being asserted, each of the counter circuits 203 in the voltage attack detection circuits 101A-101O resets the value of its COUNT signals (e.g., to zero). The central control circuit 103 then de-asserts the RESET signal. In response to the RESET signal being de-asserted, each of the counter circuits 203 in the voltage attack detection circuits 101A-101O is enabled synchronously to start counting by adjusting the value of its COUNT signals in response to clock signal CLK. For example, each of the counter circuits 203 may increase or decrease the value of the COUNT signals by one in each period of clock signal CLK. In an exemplary embodiment that is not intended to be limiting, the counter circuit 203 resets the value of the COUNT signals to zero in response to the RESET signal being asserted and then increases the value of the COUNT signals by 1 in each period of clock signal CLK, until a maximum and final value of the COUNT signals is reached.

The supply voltage VCC is provided through a power delivery network to the logic circuits in regions 102A-102O in IC 100. The power delivery network provides the supply voltage VCC, power, and supply current to the logic circuits in regions 102A-102O during operation of IC 100. Supply voltage VCC is also provided to the D input of latch circuit 202 in each of the voltage attack detection circuits 101A-101O. In response to the supply voltage VCC decreasing below the threshold voltage VMIN during a malicious supply voltage attack, the comparator circuit 201 asserts its output signal VDRP to indicate that the attack has occurred. The output signal VDRP of comparator circuit 201 is provided to the clock (CK) input of the latch circuit 202. In response to signal VDRP being asserted, the latch circuit 202 asserts the latched output signal ATCK at its Q output. As an example, the latch circuit 202 may drive its latched output signal ATCK from a logic low state to a logic high state (e.g., from 0 to 1) in response to signal VDRP being asserted. The output signal ATCK being in an asserted state indicates that the voltage attack detection circuit 101 has detected a malicious supply voltage attack in the sector containing that voltage attack detection circuit 101.

The output signal ATCK at the Q output of latch circuit 202 is provided to the count disable (CNTD) input of the counter circuit 203. In response to the output signal ATCK at the Q output of latch circuit 202 being asserted, the counter circuit 203 is disabled from continuing to adjust the value of the COUNT signals at its COUT outputs. Thus, the counter circuit 203 maintains the value of the COUNT signals constant in response to sensing that signal ATCK has been asserted. The COUNT signals are provided from the COUT outputs of the counter circuit 203 to the CIN inputs of the timestamp storage circuit 204.

The output signal ATCK is also provided from the Q output of latch circuit 202 to an input of the central control circuit 103. In response to the ATCK signal being asserted, the central control circuit 103 asserts a load enable signal LDEN. The load enable signal LDEN is provided to the load enable input LD of the timestamp storage circuit 204. In response to the load enable signal LDEN being asserted, the timestamp storage circuit 204 stores the value of the COUNT signals. The value of the COUNT signals that is stored in the timestamp storage circuit 204 indicates the time that signal ATCK was asserted by the latch circuit 202, causing counter circuit 203 to maintain the value of the COUNT signals constant.

The value of the COUNT signals that is stored in the timestamp storage circuit 204 is then provided to central control circuit 103 in signals TMSP as a timestamp. The timestamp in signals TMSP indicates the time that signal ATCK was asserted by the latch circuit 202 to indicate the occurrence of a supply voltage attack. Each of the other voltage attack detection circuits 101 in the IC 100 also provides a timestamp in a set of signals TMSP to the central control circuit 103 after that voltage attack detection circuit 101 detects that the supply voltage VCC in its sector has decreased below the threshold voltage VMIN. Thus, the central control circuit 103 receives a timestamp from each of the voltage attack detection circuits 101 in the IC 100 that detects that the supply voltage VCC in its sector has decreased below the threshold voltage VMIN. The central control circuit 103 can then read the timestamps received from the voltage attack detection circuits 101 to create a spatial timestamp map of IC 100 to identify the location of the source of the supply voltage attack.

As a specific example that is not intended to be limiting, if logic circuits in region 102F shown in FIG. 1 generate a supply voltage attack, the voltage attack detection circuit 101F detects the attack first and sends a timestamp to central control circuit 103 to indicate the time that the attack was detected. The voltage attack detection circuits 101A, 101B, 101C, 101E, 101G, 101I, 101J, and 101K in the sectors closest to the sector containing the logic circuits in region 102F detect the attack later than voltage attack detection circuit 101F, because of propagation delay in the supply voltage droop waveform propagating through the power delivery network in IC 100. For example, if the voltage attack detection circuit 101F generates a timestamp value of T, then voltage attack detection circuits 101B, 101E, 101G, and 101J may each generate a timestamp value of T+3, and the voltage attack detection (VAD) circuits 101A, 101C, 101I, and 101K may each generate a timestamp value of T+4. In this example, T indicates the value of the COUNT signals when VAD circuit 101F detected the attack, T+3 indicates 3 additional adjustments to the values of the COUNT signals after T in VAD circuits 101B, 101E, 101G, and 101J, and T+4 indicates 4 additional adjustments to the values of the COUNT signals after T in VAD circuits 101A, 101C, 101I, and 101K.

Using the timestamps from each of the VAD circuits 101 that detected the supply voltage attack, the central control circuit 103 can identify the location (e.g., the sector) of the source of the supply voltage attack in IC 100. Only the VAD circuits 101 in IC 100 that sense the supply voltage VCC in their respective sectors decreasing below the threshold voltage VMIN generate timestamps that are provided to central control circuit 103. The timestamp indicated by signals TMSP in each of the VAD circuits 101 is only valid when the ATCK signal is asserted in that VAD circuit. Because the supply voltage droop waveform attenuates as it propagates through the power delivery network out from the source location of the supply voltage attack, VAD circuits 101 that are far away from the logic circuits generating the attack may not sense a supply voltage VCC that decreases below the threshold voltage VMIN. VAD circuits 101 that do not sense VCC decreasing below VMIN do not assert their ATCK signals, and as a result, these VAD circuits 101 do not generate timestamps that are provided to central control circuit 103. The central control circuit 103 concludes that these VAD circuits 101 are far away from the location of the source of the supply voltage attack.

Another factor that affects the operation of the voltage attack detection circuits 101 is the minimum number of bits in the COUNT signals generated by counter circuit 203. The value of the COUNT signals generated by the counter circuit 203 wraps around back to its initial value after the value of the COUNT signals reaches its final value. Therefore, in order for the central control circuit 103 to be able to identify the temporal ordering of the timestamps from the voltage attack detection circuits 101 in IC 100 using the spatial timestamp map, the minimum number N of bits in the COUNT signals is determined based on the maximum total propagation delay TPD of the supply voltage droop waveform across the IC, the period TCK of clock signal CLK, and the maximum delay DYM between two adjacent sectors in the IC, as shown in equation (1) below.

The minimum number N of bits in the COUNT signals generated by the counter circuit 203 is determined based on equation (1) below.

$$TCK \times 2^N = TPD + (K \times DYM) \quad (1)$$

In equation (1), $K \geq 2$, TCK is the period of clock signal CLK, and TPD is the maximum propagation delay for the supply voltage droop waveform to travel from the source of a supply voltage attack to the sector in the IC that is farthest away from the source of the supply voltage attack. Also, in equation (1), DYM is the maximum delay for the supply voltage droop waveform to propagate between two adjacent sectors in the IC.

Yet another factor that affects the operation of the voltage attack detection circuits 101 is the minimum frequency of the clock signal CLK. The period TCK of the clock signal CLK that clocks the counter circuit 203 can be determined from equation (2) below. The frequency of clock signal CLK is 1/TCK. In equation (2), $K \geq 3$, and $MIN_{DELAY}$ is the minimum delay for the supply voltage droop waveform to propagate between sectors in the IC.

$$MIN_{DELAY} > K \times TCK \quad (2)$$

Because signal ATCK is an asynchronous signal to the counter disable input CNTD, signal ATCK may slip one clock cycle due to meta-stability. Therefore, an additional 1 clock cycle of guard band ($K \geq 3$) may be added for clock skew in clock signal CLK. As a specific example that is not intended to be limiting, if the minimum delay for the supply voltage droop waveform to propagate between adjacent sectors in the IC is 10 nanoseconds, K can be chosen to be equal to 3. In this example, the maximum period of the clock signal CLK is 3.3 nanoseconds, and the minimum frequency of the clock signal CLK is 300 megahertz.

Figure 3:
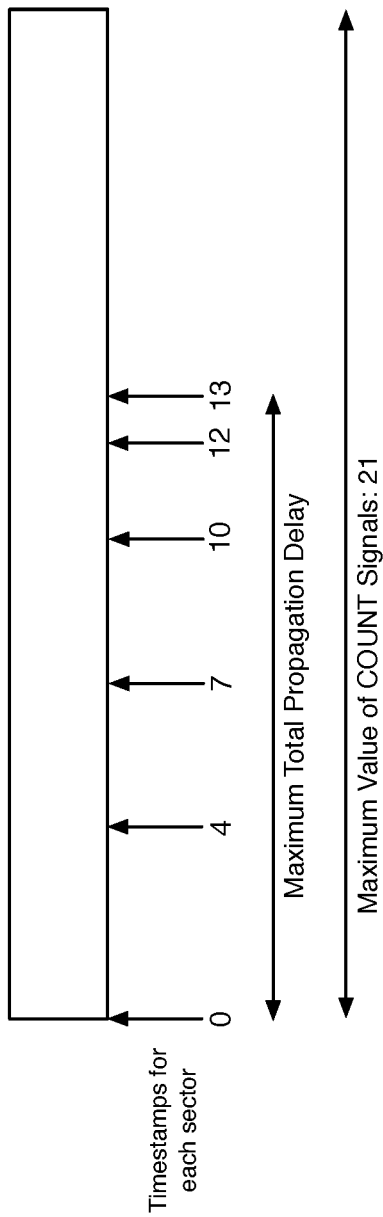
FIG. 3 illustrates examples of timestamps generated by the voltage attack detection circuits in the integrated circuit (IC) of FIG. 1 in response to a supply voltage attack, according to an embodiment.

FIG. 3 illustrates examples of timestamps generated by voltage attack detection circuits 101 in integrated circuit (IC) 100 in response to a supply voltage attack, according to an embodiment. In the example of FIG. 3, the counter circuits 203 in the VAD circuits 101 increase their COUNT signals by 1 in each cycle of clock signal CLK. Also, in the example of FIG. 3, 6 voltage attack detection (VAD) circuits 101 generate 6 timestamps having values of 0, 4, 7, 10, 12, and 13. As shown in FIG. 3, the maximum total propagation delay of the supply voltage droop waveform across IC 100 is 13 cycles of clock signal CLK. Also, the maximum delay of the supply voltage droop waveform between adjacent sectors in IC 100 is 4 cycles of clock signal CLK in the example of FIG. 3. Therefore, the value selected for the maximum value of the COUNT signals generated by the counter circuit 203 is 13+(2×4)=21. The COUNT signals generated by the counter circuit 203 need at least 5 digital bits (N=5) to generate a maximum binary value of 21.

In the example of FIG. 3, central control circuit 103 is able to determine that the VAD circuit 101 that generates the timestamp of 0 is the first VAD circuit 101 to detect the supply voltage attack in IC 100, because of the gap of 8 between timestamps 13 and 0 (i.e., 21−13=8) is the largest gap between the timestamps. Then, the central control circuit 103 determines the order in which the remaining VAD circuits 101 detected the supply voltage attack based on the sequential order of the remaining timestamps. In the example of FIG. 3, central control circuit 103 determines that the VAD circuits 101 that generated the timestamp values of 4, 7, 10, 12, and 13 were the second, third, fourth, fifth, and sixth VAD circuits, respectively, to detect the supply voltage attack.

Figure 4:
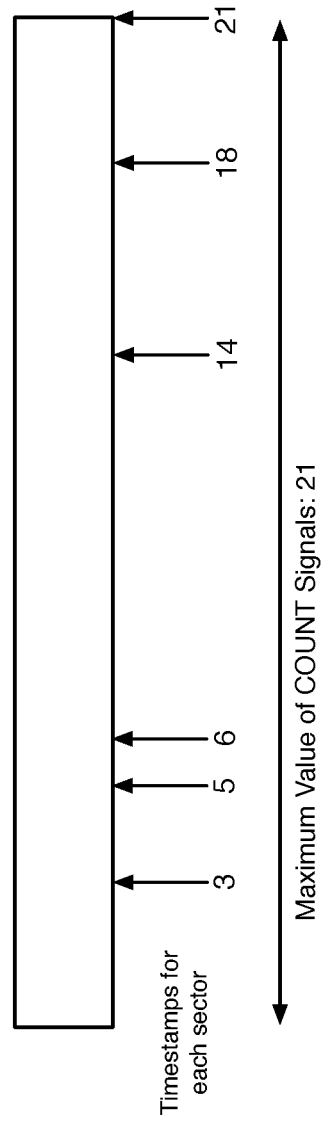
FIG. 4 illustrates additional examples of timestamps generated by the voltage attack detection circuits in the integrated circuit (IC) of FIG. 1 in response to a supply voltage attack, according to an embodiment.

FIG. 4 illustrates additional examples of timestamps generated by voltage attack detection circuits 101 in integrated circuit (IC) 100 in response to a supply voltage attack, according to an embodiment. In the example of FIG. 4, the counter circuits 203 in the VAD circuits 101 increase their COUNT signals by 1 in each cycle of clock signal CLK. Also, in the example of FIG. 4, 6 voltage attack detection (VAD) circuits 101 generate 6 timestamps having values of 3, 5, 6, 14, 18, and 21. In FIG. 4, the maximum total propagation delay of the supply voltage droop waveform across IC 100 is 13 cycles of clock signal CLK. The maximum delay of the supply voltage droop waveform between adjacent sectors in IC 100 is 4 cycles of clock signal CLK in the example of FIG. 4. The value selected for the maximum value of the COUNT signals generated by the counter circuit 203 is 21, and the COUNT signals have 5 digital bits (N=5).

In the example of FIG. 4, central control circuit 103 is able to determine that the VAD circuit 101 that generates the timestamp of 14 is the first VAD circuit 101 to detect the supply voltage attack in IC 100, because of the gap of 8 between timestamps 6 and 14 (i.e., 14−6=8) is the largest gap between the timestamps. Then, the central control circuit 103 determines the order in which the remaining VAD circuits 101 detected the supply voltage attack based on the sequential order of the remaining timestamps above 14, with a wraparound from 21 to 0. In the example of FIG. 4, central control circuit 103 determines that the VAD circuits 101 that generated the timestamps of 18, 21, 3, 5, and 6 were the second, third, fourth, fifth, and sixth VAD circuits 101, respectively, to detect the supply voltage attack.

The following examples pertain to further embodiments. Example 1 is an integrated circuit comprising: a first voltage decrease detection circuit comprising a first comparator circuit that compares a supply voltage in the integrated circuit to a threshold voltage to generate a first detection signal that indicates a decrease in the supply voltage, a first counter circuit that generates first count signals and that maintains a value of the first count signals constant in response to the first detection signal indicating the decrease, and a first timestamp storage circuit that stores the value of the first count signals as a first timestamp in response to the first detection signal indicating the decrease; and a control circuit that determines a location of a source of the decrease in the integrated circuit based on the first timestamp.

In Example 2, the integrated circuit of Example 1 may optionally further comprise: a second voltage decrease detection circuit comprising a second comparator circuit that compares the supply voltage to the threshold voltage to generate a second detection signal that indicates the decrease in the supply voltage, a second counter circuit that generates second count signals and that maintains a value of the second count signals constant in response to the second detection signal indicating the decrease, and a second timestamp storage circuit that stores the value of the second count signals as a second timestamp in response to the second detection signal indicating the decrease, wherein the control circuit determines the location of the source of the decrease in the integrated circuit based on the first and the second timestamps.

In Example 3, the integrated circuit of any one of Examples 1-2 may optionally further include wherein the decrease in the supply voltage below the threshold voltage indicates an attack.

In Example 4, the integrated circuit of Example 2 may optionally further include, wherein the control circuit determines which one of the first or the second voltage decrease detection circuits is nearest to the location of the source of the decrease based on a largest gap between values of the first and the second timestamps.

In Example 5, the integrated circuit of any one of Examples 1-4 may optionally further include, wherein the first voltage decrease detection circuit further comprises a latch circuit that outputs a latched signal to the first counter circuit in response to a value of the first detection signal that indicates the decrease, and wherein the first counter circuit maintains the value of the first count signals constant in response to the latched signal indicating the decrease.

In Example 6, the integrated circuit of Example 5 may optionally further include, wherein the control circuit asserts a load enable signal in response to the latched signal indicating the decrease, and wherein the first timestamp storage circuit stores the value of the first count signals as the first timestamp in response to the load enable signal being asserted.

In Example 7, the integrated circuit of any one of Examples 1-6 may optionally further include, wherein the first counter circuit resets the value of the first count signals in response to the control circuit asserting a reset signal, and wherein the first counter circuit adjusts the value of the first count signals in response to a clock signal.

In Example 8, the integrated circuit of any one of Examples 1-7 may optionally further include, wherein the first comparator circuit is a hysteretic comparator circuit.

Example 9 is a method for detecting a location of a source of a decrease in a supply voltage in an integrated circuit, the method comprising: comparing the supply voltage in the integrated circuit to a threshold voltage using a first comparator circuit in a first voltage decrease detection circuit to generate a first detection signal that indicates the decrease in the supply voltage; generating first count signals using a first counter circuit; maintaining a value of the first count signals constant in response to the first detection signal indicating the decrease in the supply voltage; storing the value of the first count signals in a first timestamp storage circuit as a first timestamp in response to the first detection signal indicating the decrease in the supply voltage; and determining the location of the source of the decrease in the supply voltage in the integrated circuit based on the first timestamp using a control circuit.

In Example 10, the method of Example 9 may optionally further comprise: comparing the supply voltage to the threshold voltage using a second comparator circuit in a second voltage decrease detection circuit to generate a second detection signal that indicates the decrease in the supply voltage; generating second count signals using a second counter circuit; maintaining a value of the second count signals constant in response to the second detection signal indicating the decrease in the supply voltage; storing the value of the second count signals in a second timestamp storage circuit as a second timestamp in response to the second detection signal indicating the decrease in the supply voltage; and determining the location of the source of the decrease in the supply voltage in the integrated circuit based on the first and the second timestamps using the control circuit.

In Example 11, the method of Example 10 may optionally further comprise: comparing the supply voltage to the threshold voltage using a third comparator circuit in a third voltage decrease detection circuit to generate a third detection signal that indicates the decrease in the supply voltage; generating third count signals using a third counter circuit; maintaining a value of the third count signals constant in response to the third detection signal indicating the decrease in the supply voltage; storing the value of the third count signals in a third timestamp storage circuit as a third timestamp in response to the third detection signal indicating the decrease in the supply voltage; and determining the location of the source of the decrease in the supply voltage in the integrated circuit based on the first, the second, and the third timestamps using the control circuit.

In Example 12, the method of Example 11 may optionally further comprise: determining which one of the first, the second, or the third voltage decrease detection circuits is nearest to the location of the source of the decrease in the supply voltage using the control circuit based on a largest gap between values of the first, the second, and the third timestamps.

In Example 13, the method of any one of Examples 9-12 may optionally further comprise: providing a latched signal from a latch circuit to the first counter circuit in response to a value of the first detection signal that indicates the decrease in the supply voltage, wherein maintaining the value of the first count signals constant further comprises maintaining the value of the first count signals constant using the first counter circuit in response to the latched signal indicating the decrease in the supply voltage.

In Example 14, the method of Example 13 may optionally further comprise: asserting a load enable signal using the control circuit in response to the latched signal indicating the decrease in the supply voltage, wherein storing the value of the first count signals in the first timestamp storage circuit as the first timestamp further comprises storing the value of the first count signals in the first timestamp storage circuit as the first timestamp in response to the load enable signal being asserted.

Example 15 is an integrated circuit comprising: a first voltage decrease detection circuit comprising a first comparator circuit that compares a supply voltage in the integrated circuit to a threshold voltage to generate a first detection signal that indicates a decrease in the supply voltage, and a first timestamp storage circuit that stores a first timestamp in response to the first detection signal indicating the decrease; a second voltage decrease detection circuit comprising a second comparator circuit that compares the supply voltage to the threshold voltage to generate a second detection signal that indicates the decrease, and a second timestamp storage circuit that stores a second timestamp in response to the second detection signal indicating the decrease; and a control circuit that determines a location of a source of the decrease in the integrated circuit based on the first and the second timestamps.

In Example 16, the integrated circuit of Example 15 may optionally further comprise: a third voltage decrease detection circuit comprising a third comparator circuit that compares the supply voltage to the threshold voltage to generate a third detection signal that indicates the decrease, and a third timestamp storage circuit that stores a third timestamp in response to the third detection signal indicating the decrease, wherein the control circuit determines the location of the source of the decrease in the integrated circuit based on the first, the second, and the third timestamps.

In Example 17, the integrated circuit of Example 16 may optionally further include, wherein the control circuit determines which one of the first, the second, or the third voltage decrease detection circuits is nearest to the location of the source of the decrease based on a largest gap between values of the first, the second, and the third timestamps.

In Example 18, the integrated circuit of any one of Examples 15-17 may optionally further include, wherein the first voltage decrease detection circuit further comprises a first counter circuit that generates first count signals and that maintains a value of the first count signals constant in response to the first detection signal indicating the decrease, and wherein the first timestamp storage circuit stores the value of the first count signals as the first timestamp in response to the first detection signal indicating the decrease.

In Example 19, the integrated circuit of any one of Examples 15-18 may optionally further include, wherein the first detection signal indicates that the decrease in the supply voltage below the threshold voltage is caused by an attack.

In Example 20, the integrated circuit of Example 18 may optionally further include, wherein the first voltage decrease detection circuit further comprises a latch circuit that outputs a latched signal to the first counter circuit in response to a value of the first detection signal that indicates the decrease, and wherein the first counter circuit maintains the value of the first count signals constant in response to the latched signal indicating the decrease.

The foregoing description of the exemplary embodiments has been presented for the purpose of illustration. The foregoing description is not intended to be exhaustive or to be limiting to the examples disclosed herein. The foregoing is merely illustrative of the principles of this disclosure and various modifications can be made by those skilled in the art. The foregoing embodiments may be implemented individually or in any combination.

What is claimed is:

1. An integrated circuit comprising:
a first voltage decrease detection circuit comprising a first comparator circuit that compares a supply voltage in the integrated circuit to a threshold voltage to generate a first detection signal that indicates a decrease in the supply voltage, a first storage circuit that asserts a first stored signal in response to the first detection signal indicating the decrease in the supply voltage, a first counter circuit that generates first count signals and that maintains a value of the first count signals constant in response to the first stored signal being asserted, and a first timestamp storage circuit that stores the value of the first count signals as a first timestamp.

2. The integrated circuit of claim 1 further comprising:
a second voltage decrease detection circuit comprising a second comparator circuit that compares the supply voltage to the threshold voltage to generate a second detection signal that indicates the decrease in the supply voltage, a second storage circuit that asserts a second stored signal in response to the second detection signal indicating the decrease in the supply voltage, a second counter circuit that generates second count signals and that maintains a value of the second count signals constant in response to the second stored signal being asserted, and a second timestamp storage circuit that stores the value of the second count signals as a second timestamp.

3. The integrated circuit of claim 2, wherein the decrease in the supply voltage below the threshold voltage indicates an attack.

4. The integrated circuit of claim 2 further comprising:
a control circuit that determines which one of the first or the second voltage decrease detection circuits is nearest to a location of a source of the decrease in the supply voltage in the integrated circuit based on a largest gap between the first and the second timestamps.

5. The integrated circuit of claim 1, wherein the first storage circuit is a latch circuit.

6. The integrated circuit of claim 1 further comprising:
a control circuit that asserts a load enable signal in response to the first stored signal indicating the decrease in the supply voltage, wherein the first timestamp storage circuit stores the value of the first count signals as the first timestamp in response to the load enable signal being asserted.

7. The integrated circuit of claim 1, wherein the first counter circuit resets the value of the first count signals in response to a reset signal, and wherein the first counter circuit adjusts the value of the first count signals in response to a clock signal.

8. The integrated circuit of claim 1, wherein the first comparator circuit is a hysteretic comparator circuit.

9. A method for detecting a decrease in a supply voltage in an integrated circuit, the method comprising:
comparing the supply voltage in the integrated circuit to a threshold voltage using a first comparator circuit in a first voltage decrease detection circuit to generate a first detection signal that indicates the decrease in the supply voltage;
generating first count signals using a first counter circuit;
asserting a first stored signal using a first storage circuit in response to the first detection signal indicating the decrease in the supply voltage;
maintaining a value of the first count signals constant in response to the first stored signal being asserted; and
storing the value of the first count signals in a first timestamp storage circuit as a first timestamp.

10. The method of claim 9 further comprising:
comparing the supply voltage to the threshold voltage using a second comparator circuit in a second voltage decrease detection circuit to generate a second detection signal that indicates the decrease in the supply voltage;
generating second count signals using a second counter circuit;
asserting a second stored signal using a second storage circuit in response to the second detection signal indicating the decrease in the supply voltage;
maintaining a value of the second count signals constant in response to the second stored signal being asserted; and
storing the value of the second count signals in a second timestamp storage circuit as a second timestamp
determining the location of the source of the decrease in the supply voltage in the integrated circuit based on the first and the second timestamps using the control circuit.

11. The method of claim 10 further comprising:
comparing the supply voltage to the threshold voltage using a third comparator circuit in a third voltage decrease detection circuit to generate a third detection signal that indicates the decrease in the supply voltage;
generating third count signals using a third counter circuit;
asserting a third stored signal using a third storage circuit in response to the third detection signal indicating the decrease in the supply voltage;
maintaining a value of the third count signals constant in response to the third stored signal being asserted; and
storing the value of the third count signals in a third timestamp storage circuit as a third timestamp.

12. The method of claim 11 further comprising:
determining which one of the first, the second, or the third voltage decrease detection circuits is nearest to a location of a source of the decrease in the supply voltage in the integrated circuit using a control circuit based on a largest gap between values of the first, the second, and the third timestamps.

13. The method of claim 9 wherein the first storage circuit is a latch circuit.

14. The method of claim 9 further comprising:
asserting a load enable signal using a control circuit in response to the first stored signal being asserted,
wherein storing the value of the first count signals in the first timestamp storage circuit as the first timestamp further comprises storing the value of the first count signals in the first timestamp storage circuit as the first timestamp in response to the load enable signal being asserted.

15. An integrated circuit comprising:
a first voltage decrease detection circuit comprising a first comparator circuit that compares a supply voltage in the integrated circuit to a threshold voltage to generate a first detection signal that indicates a decrease in the supply voltage, a first storage circuit that asserts a first stored signal in response to the first detection signal indicating the decrease in the supply voltage, and a first timestamp storage circuit that stores a first timestamp after the first detection signal indicating the decrease; and
a second voltage decrease detection circuit comprising a second comparator circuit that compares the supply voltage to the threshold voltage to generate a second detection signal that indicates the decrease in the supply voltage, a second storage circuit that asserts a second stored signal in response to the second detection signal indicating the decrease in the supply voltage, and a second timestamp storage circuit that stores a second timestamp after the second detection signal indicating the decrease.

16. The integrated circuit of claim 15 further comprising:
a third voltage decrease detection circuit comprising a third comparator circuit that compares the supply voltage to the threshold voltage to generate a third detection signal that indicates the decrease in the supply voltage, a third storage circuit that asserts a third stored signal in response to the third detection signal indicating the decrease in the supply voltage, and a third timestamp storage circuit that stores a third timestamp after the third detection signal indicating the decrease.

17. The integrated circuit of claim 16 further comprising:
a control circuit that determines which one of the first, the second, or the third voltage decrease detection circuits is nearest to a location of a source of the decrease in the integrated circuit based on a largest gap between values of the first, the second, and the third timestamps.

18. The integrated circuit of claim 15, wherein the first voltage decrease detection circuit further comprises a first counter circuit that generates first count signals and that maintains a value of the first count signals constant in response to the first stored signal being asserted, and wherein the first timestamp storage circuit stores the value of the first count signals as the first timestamp.

19. The integrated circuit of claim 15, wherein the first detection signal indicates that the decrease in the supply voltage below the threshold voltage is caused by an attack.

20. The integrated circuit of claim 16 further comprising:
a control circuit that determines which of the first, the second, or the third voltage decrease detection circuits is nearest to a location of a source of the decrease in the supply voltage in the integrated circuit based on the first, the second, and the third timestamps.

* * * * *